United States Patent
Lee

(10) Patent No.: US 10,547,140 B2
(45) Date of Patent: Jan. 28, 2020

(54) CONNECTING COMPONENT WITH WATERPROOF DEVICE AND ELECTRONIC DEVICE INCLUDING THE SAME

(71) Applicant: Samsung Electronics Co., Ltd., Gyeonggi-do (KR)

(72) Inventor: Sung-Ho Lee, Hwaseong-si (KR)

(73) Assignee: Samsung Electronics Co., Ltd., Samsung-ro, Yeongtong-gu, Suwon-si, Gyeonggi-do (KR)

( * ) Notice: Subject to any disclaimer, the term of this patent is extended or adjusted under 35 U.S.C. 154(b) by 0 days.

(21) Appl. No.: 15/946,825

(22) Filed: Apr. 6, 2018

(65) Prior Publication Data

US 2018/0294598 A1 Oct. 11, 2018

(30) Foreign Application Priority Data

Apr. 6, 2017 (KR) .................. 10-2017-0044937

(51) Int. Cl.
*H01R 13/52* (2006.01)
*G06F 1/16* (2006.01)

(52) U.S. Cl.
CPC ......... *H01R 13/521* (2013.01); *G06F 1/1656* (2013.01); *H01R 13/5202* (2013.01); *H01R 13/5213* (2013.01)

(58) Field of Classification Search
CPC ............ H01R 13/5202; H01R 13/5205; H01R 13/5219; H01R 13/5221; H01R 33/965; H01R 13/52
USPC ......................................... 439/371, 587, 589
See application file for complete search history.

(56) References Cited

U.S. PATENT DOCUMENTS

| | | | |
|---|---|---|---|
| 2012/0149226 A1* | 6/2012 | Ishibashi ............ | H01R 13/5221 439/271 |
| 2013/0252061 A1 | 9/2013 | Kim et al. | |
| 2015/0380862 A1 | 12/2015 | Song et al. | |
| 2016/0086745 A1 | 3/2016 | Seo et al. | |

FOREIGN PATENT DOCUMENTS

| KR | 10-2013-0062711 A | 6/2013 |
|---|---|---|
| KR | 10-2013-0106981 A | 10/2013 |
| KR | 10-2016-0001405 A | 1/2016 |
| KR | 10-2016-0034744 A | 3/2016 |
| KR | 10-2016-0095396 A | 8/2016 |

* cited by examiner

*Primary Examiner* — Phuong K Dinh
(74) *Attorney, Agent, or Firm* — Cha & Reiter, LLC.

(57) ABSTRACT

A connecting component with a waterproof device according to one embodiment may include: a case having an insertion hole into which an external device is inserted; and the waterproof device may include: a body portion disposed to surround a peripheral portion of the insertion hole; and a protrusion extending from the body portion and protruding in a direction parallel to an insertion direction of the external device. Other embodiments are also possible.

19 Claims, 24 Drawing Sheets

CONNECTING COMPONENT WITH WATERPROOF DEVICE AND ELECTRONIC DEVICE INCLUDING THE SAME

CROSS-REFERENCE TO RELATED APPLICATION(S)

This application is based on and claims priority under 35 U.S.C. § 119 of Korean Patent Application No. 10-2017-0044937, filed on Apr. 6, 2017, in the Korean Intellectual Property Office, the disclosure of which is incorporated herein by reference in its entirety.

BACKGROUND

1. Field

Various embodiments disclosed herein relate to a connecting component including a waterproof device and an electronic device including the connecting component.

2. Description of the Related Art

Electronic devices have been developed to perform various specific functions according to programs incorporated therein. Examples of such devices include electronic schedulers, portable multimedia players, mobile communication terminals, tablet PCs, image/sound devices, desktop PCs, laptop PCs, vehicular navigation systems, home appliances, etc. For example, the electronic devices may output information stored therein as audio or images. As components of the electronic devices have become increasingly integrated, and as super-high speed and large-capacity wireless communication have become popular, an increasing number of functions may be provided in a single electronic device. And as these electronic devices become more useful, users carry these devices with them more frequently. Due to this, the operating environment of the electronic devices may change depending on the movements of the users, and these device may be more likely to be exposed to contamination such as water or foreign matter.

SUMMARY

As disclosed herein, an electronic device may include a connector for connecting with an external device. Because the connector is exposed to the outside of the electronic device, water or foreign matter may be introduced into the interior of the electronic device from the outside through the connector. To prevent this, the electronic device may be provided with a waterproof device.

In the assembly process of the electronic device, the waterproof device, which has a circular cross-sectional shape, may be disposed along the outer surface of the connector. When the connector is inserted into its corresponding opening in the housing of the electronic device, there is a possibility that the waterproof device may be pushed by the inner wall of the housing and detach from the connector.

In the case where the waterproof device is joined to the connector by a double injection method, when the waterproof device is detached from the connector, both the waterproof device and the entire connector may have to be replaced.

In the waterproof device included in the electronic device according to various embodiments of the present disclosure, occurrence of defects are reduced.

In the waterproof device included in the electronic device according to various embodiments of the present disclosure, waterproof characteristics can be maintained while the device can be conveniently assembled.

According to one embodiment, a connecting component with a waterproof device may include: a case having an insertion hole into which a part of an external device is inserted; and the waterproof device may include: a body portion disposed to surround a peripheral portion of the insertion hole; and a protrusion extending from the body portion and protruding in a direction parallel to an insertion direction of the external device.

According to one embodiment, an electronic device may include: a housing including a first plate facing in a first direction, a second plate facing in a second direction opposite the first direction, and a side member surrounding a space between the first plate and the second plate; an opening formed in the side member; a connecting component located in the space and configured to connect to an external device through the opening; and a waterproof device configured to seal a gap between the connecting component and an inner wall of the housing, where the waterproof device may include a body portion enclosing a first face of the connecting component and being in contact with the inner wall of the housing, and a protrusion extending and protruding from the body portion and in contact with a second face of the connecting component.

According to one embodiment, a method of assembling a waterproof device in an electronic device may include: providing a waterproof device including a body portion and a protrusion formed to protrude from the body portion; causing the body portion to enclose a first face of a connecting component of the electronic device such that the protrusion faces a second face of the connecting component and is in contact with the second face of the connecting component; and bringing the body portion into contact with an inner wall of a housing of the electronic device by aligning a part of the connecting component to an opening of the electronic device.

The waterproof device included in the electronic device according to various embodiments is able to prevent foreign matter from being introduced into the gap between a face of the connecting component and the body portion. In accomplishing this, the waterproof device has a protrusion that may be brought into contact with the face of the connecting component.

The waterproof device included in the electronic device according to various embodiments also is able to prevent foreign matter from being introduced into the gap between the connecting component and the opening of the housing. To accomplish this, the body portion of the waterproof device may be brought into contact with an inner wall of the housing while enclosing a face of the connecting component.

BRIEF DESCRIPTION OF THE DRAWINGS

The above and other aspects, features, and advantages of the present disclosure will be more apparent from the following detailed description taken in conjunction with the accompanying drawings, in which.

DETAILED DESCRIPTION

Figure 1:
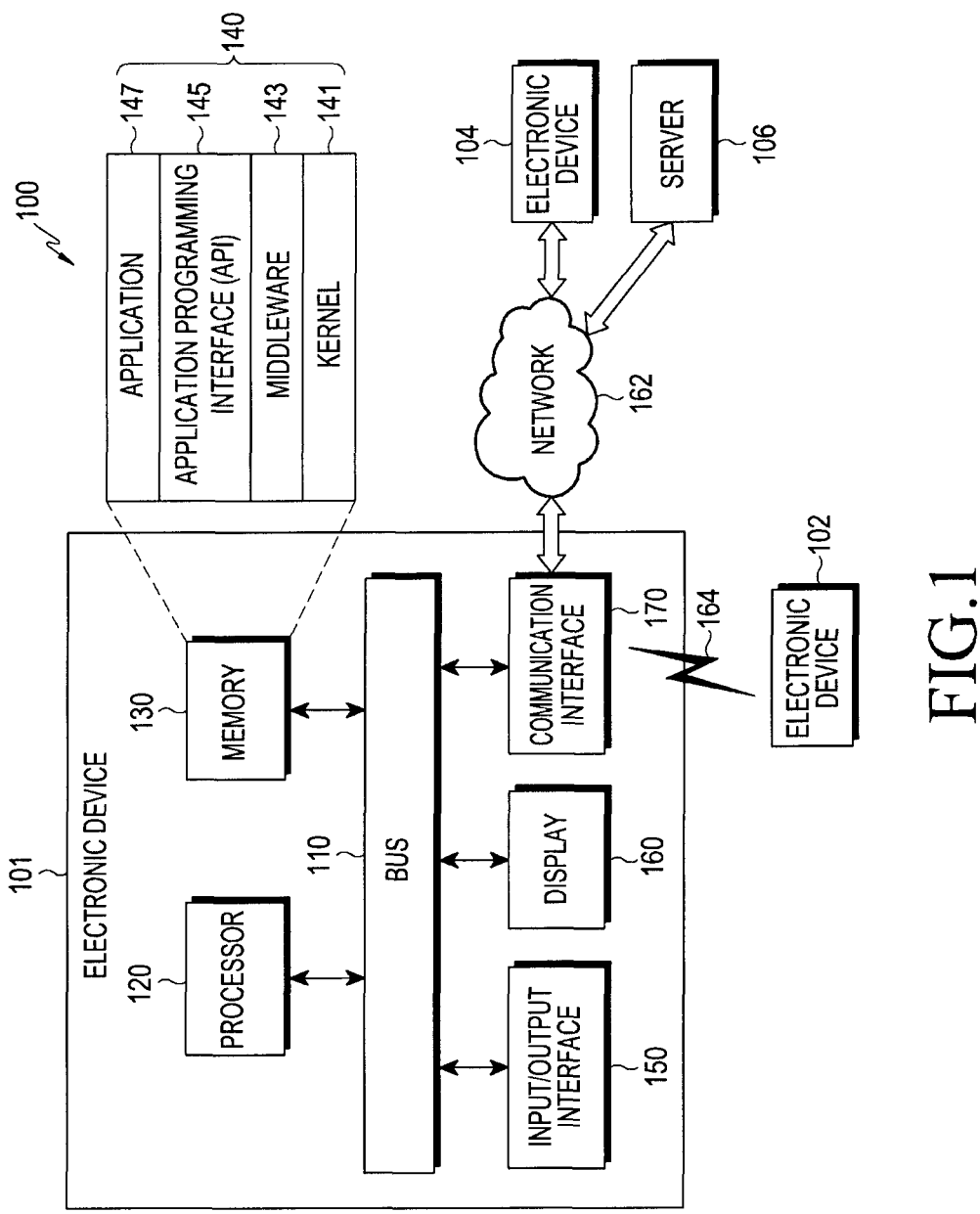
FIG. 1 is a block diagram illustrating an electronic device according to an embodiment within a network environment.

Hereinafter, various embodiments will be described with reference to the accompanying drawings. The embodiments and the terms used therein are not intended to limit the technology disclosed herein to explicitly disclosed embodiments, and should be understood to include various modifications, equivalents, and/or alternatives to the corresponding embodiments. In describing the drawings, similar reference numerals may be used to designate similar constituent elements. Singular expressions may include the corresponding plural expression unless explicitly indicated otherwise. The expression "a first," "a second," "the first," or "the second" used in various embodiments may refer to corresponding components without implying an order of importance, and are used merely to distinguish each component from the others without unduly limiting the components. When an element (e.g., first element) is referred to as being "(functionally or communicatively) connected," or "directly coupled" to another element (second element), the element may be connected directly to the another element or connected to the another element through yet another element (e.g., third element).

The expression "configured to" as used in various embodiments may be interchangeable with, for example, "suitable for," "having the capacity to," "designed to," "adapted to," "made to," or "capable of in terms of" hardware or software, depending on the context. Alternatively, in some situations, the expression "device configured to" may mean that the device, together with other devices or components, "is able to." For example, the phrase "processor adapted (or configured) to perform A, B, and C" may mean a dedicated processor (e.g., embedded processor) only for performing the corresponding operations or a generic-purpose processor (e.g., Central Processing Unit (CPU) or Application Processor (AP)) that can perform the corresponding operations by executing one or more software programs stored in a memory device.

An electronic device according to various embodiments may include at least one of, for example, a smart phone, a tablet Personal Computer (PC), a mobile phone, a video phone, an electronic book reader (e-book reader), a desktop PC, a laptop PC, a netbook computer, a workstation, a server, a Personal Digital Assistant (PDA), a Portable Multimedia Player (PMP), a MPEG-1 audio layer-3 (MP3) player, a mobile medical device, a camera, and a wearable device. According to various embodiments, the wearable device may include at least one of an accessory type (e.g., a watch, a ring, a bracelet, an anklet, a necklace, a glasses, a contact lens, or a Head-Mounted Device (HMD)), a fabric or clothing integrated type (e.g., an electronic clothing), a body-mounted type (e.g., a skin pad, or tattoo), and a bio-implantable type (e.g., an implantable circuit). In some embodiments, the electronic device may include at least one of, for example, a television, a Digital Video Disk (DVD) player, an audio, a refrigerator, an air conditioner, a vacuum cleaner, an oven, a microwave oven, a washing machine, an air cleaner, a set-top box, a home automation control panel, a security control panel, a TV box (e.g., Samsung HomeSync™, Apple TV™, or Google TV™), a game console (e.g., Xbox™ and PlayStation™), an electronic dictionary, an electronic key, a camcorder, and an electronic photo frame.

In other embodiments, the electronic device may include at least one of various medical devices (e.g., various portable medical measuring devices (a blood glucose monitoring device, a heart rate monitoring device, a blood pressure measuring device, a body temperature measuring device, etc.), a Magnetic Resonance Angiography (MRA), a Magnetic Resonance Imaging (MRI), a Computed Tomography (CT) machine, and an ultrasonic machine), a navigation device, a Global Positioning System (GPS) receiver, an Event Data Recorder (EDR), a Flight Data Recorder (FDR), a Vehicle Infotainment Devices, an electronic devices for a ship (e.g., a navigation device for a ship, and a gyrocompass), avionics, security devices, an automotive head unit, a robot for home or industry, an Automatic Teller's Machine (ATM) in banks, Point Of Sales (POS) in a shop, or internet device of things (e.g., a light bulb, various sensors, electric or gas meter, a sprinkler device, a fire alarm, a thermostat, a streetlamp, a toaster, a sporting goods, a hot water tank, a heater, a boiler, etc.). According to some embodiments, an electronic device may include at least one of a part of furniture or a building/structure, an electronic board, an electronic signature receiving device, a projector, and various types of measuring instruments (e.g., a water meter, an electric meter, a gas meter, a radio wave meter, and the like). In various embodiments, the electronic device may be flexible, or may be a combination of one or more of the aforementioned various devices. The electronic device according to one embodiment is not limited to the above described devices. The term "user" as used in various embodiments may indicate a person who uses an electronic device or a device (e.g., artificial intelligence electronic device) that uses an electronic device.

FIG. 1 is a block diagram illustrating an electronic device according to an embodiment within a network environment.

An electronic device 101 within the network environment 100, in one embodiment, will be described with reference to FIG. 1. The electronic device 101 may include a bus 110, a processor 120, a memory 130, an input/output interface 150, a display 160, and a communication interface 170. In a certain embodiment, at least one of the above-mentioned components may be omitted from the electronic device 101 or the electronic device 102 may additionally include other components. The bus 110 may include a circuit that interconnects the above-mentioned components 110 to 170 and transfers communication information (e.g., a control message or data) among the components 110 to 170. The processor 120 may include one or more of a Central Processing Unit (CPU), an Application Processor (AP), and a Communication Processor (CP). The processor 120 may execute, for example, an arithmetic operation or data processing that is related to the control and/or communication of one or more other components of the electronic device 101.

The memory 130 may include a volatile memory or a non-volatile memory. The memory 130 may store, for example, commands or data that are related to one or more other components of the electronic device 101. According to one embodiment, the memory 130 may store software or a program 140. The program 140 may include, for example, a kernel 141, middleware 143, an Application Programming Interface (API) 145, or an application program ("application") 147. At least one of the kernel 141, the middleware 143, and the API 145 may be referred to as an Operating System (OS). The kernel 141 may control or manage, for example, system resources (e.g., the bus 110, the processor 120, and the memory 130) that are used for executing operations or functions implemented in the other programs (e.g., the middleware 143, the API 145, or the application 147). In addition, the kernel 141 may provide an interface that allows the middleware 143, the API 145, or the application 147 to access individual components of the electronic device 101 so as to control or manage the system resources.

The middleware 143 may play an intermediary role such that, for example, the API 145 or the application 147 may communicate with the kernel 141 so as to exchange data. In addition, the middleware 143 may process one or more task requests which are received from the applications 147, according to priority. For example, the middleware 143 may assign the priority to be capable of using a system resource of the electronic device 11 (e.g., the bus 110, the processor 120, or the memory 130) to at least one of the applications 147, and may process the one or more task requests. The API 145 is, for example, an interface that allows the applications 147 to control functions provided from the kernel 141 or the middleware 143, and may include, for example, one or more interfaces or functions (e.g., commands) for a file control, a window control, an image processing, or a character control. The input/output interface 150 may transmit commands or data, which are entered from, for example, a user or any other external device, to the other component(s) of the electronic device 11, or may output commands or data, which are received from the other component(s) of the electronic device 11, to the user or the other external device.

The display device 160 may include, for example, a Liquid Crystal Display (LCD), a Light Emitting Diode (LED) display, an Organic Light Emitting Diode (OLED) display, a MicroElectroMechanical System (MEMS) display, an electronic paper display, or a touchscreen display. The display 160 may display various contents (e.g., text, image, video, icon, or symbol) to, for example, the user. The display 160 may include a touch screen, and may receive a touch input, a gesture input, a proximity input, or a hovering input that is made using, for example, an electronic pen or a part of the user's body.

The communication interface 170 may set, for example, communication between the electronic device 11 and an external device (e.g., a first external electronic device 102, a second external device 104, or a server 106). For example, the communication interface 170 may be connected with a network 162 through wired or wireless communication so as to communicate with the external device (e.g., the second external electronic device 104 or the server 106). The wireless communication circuit may include the communication interface 170.

The wireless communication may include a cellular communication that uses at least one of, for example, Long-Term Evolution (LTE), LTE Advance (LTE-A), Code Division Multiple Access (CDMA), Wideband CDMA (WCDMA), Universal Mobile Telecommunication System (UMTS), Wireless Broadband (WiBro), and Global System for Mobile communication (GSM). According to one embodiment, for example, as exemplified by an element 164 in FIG. 1, the wireless communication may include at least one of, for example, Wi-Fi, Light Fidelity (Li-Fi), Bluetooth, Bluetooth Low Energy (BLE), ZigBee, Near Field Communication (NFC), Magnetic Secure Transmission (MST), Radio Frequency (RF), and Body Area Network (BAN). According to one embodiment, the wireless communication may include GNSS. The GNSS may be, for example, a Global Positioning System (GPS), a Global navigation satellite system (Glonass), a Beidou navigation satellite system (hereinafter, "Beidou"), Galileo, or a European global satellite-based navigation system. Hereinafter, in an embodiment, "GPS" may be interchangeably used with "GNSS." The wired communication may use at least one of, for example, Universal Serial Bus (USB), High Definition Multimedia Interface (HDMI), Recommended Standard 232 (RS-232), power line communication, and Plain Old Telephone Service (POTS). The network 162 may include a telecommunication network (e.g., at least one of a computer network (e.g., LAN or WAN), the internet, and a telephone network).

Each of the first and second external electronic devices 102 and 104 may be the same type as or different from the electronic device 101. According to various embodiments, all or some of the operations to be executed by the electronic device 101 may be executed in another electronic device or a plurality of other electronic devices (e.g., the electronic devices 102 and 104 or the server 106). According to one embodiment, in the case where the electronic device 101 should perform a certain function or service automatically or by a request, the electronic device 101 may request some functions or services that are associated therewith from the other electronic devices (e.g., the electronic devices 102 and 104 or the server 106), instead of, or in addition to, executing the functions or service by itself. The other electronic devices (e.g., the electronic devices 102 and 104 or the server 106) may execute the requested functions or additional functions, and may deliver the results to the electronic device 101. The electronic device 101 may provide the requested functions or services by processing the received results as they are or additionally. For this purpose, for example, a cloud computing technique, a distributed computing technique, or a client-server computing technique may be used.

Figure 2:
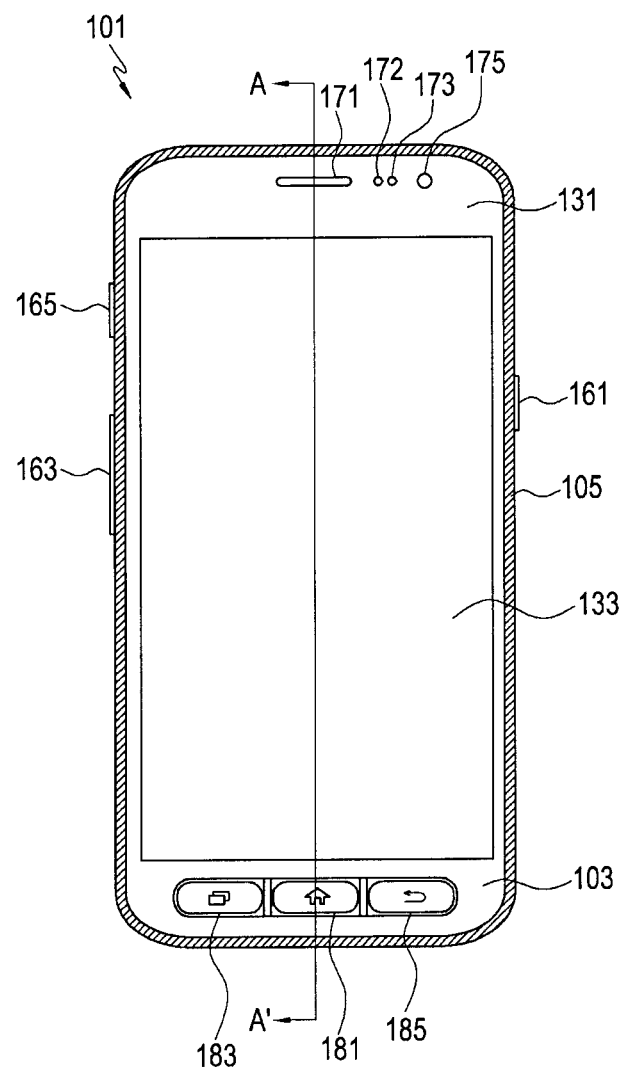
FIG. 2 is a front view illustrating an electronic device according to an embodiment.

FIG. 2 is a front view illustrating an electronic device (e.g., the electronic device 101 in FIG. 1) according to an embodiment.

Referring to FIG. 2, an electronic device (e.g., the electronic device 101 in FIG. 1) according to an embodiment may include a housing 103. The housing 103 may include a first plate 131. The first plate 131 may include a front cover 133. The front cover 133 may form at least a portion of the first plate 131. According to one embodiment, the front cover 133 may form the entire front face or substantially the entire front face of the first plate 131. According to one embodiment, the housing 103 may be made with various materials, including coated or colored glass, polymers, and/or metals.

According to one embodiment, mechanically operating buttons or touch keys 181, 183, and 185 may be provided in the lower region of the front face (e.g., the first plate 131) of the housing 103. For example, the touch keys 181, 183, and 185 may generate input signals when they are contacted by a user's body.

According to one embodiment, a speaker hole 171, an illuminance sensor 172, a proximity sensor 173, and a camera 175 may be disposed on the upper region of the housing 103.

According to one embodiment, first, second, and third function keys 161, 163, and 165 may be disposed on one or more side faces of the housing 103. For example, the first, second, and third function keys 161, 163, and 165 may perform volume control function or power on/off function.

According to one embodiment, the electronic device 101 may include a protective cover 105 for protecting the housing 103. The protective cover 105 may cover part of the front face of the housing 103 (e.g., periphery of the first plate 131) while enclosing the side face of the housing 103. The protective cover 105 may be detachably coupled to the housing 103. According to one embodiment, the protective cover 105 may be coupled to the housing 103 using the technique of double injection molding. The protective cover 105 may be made of a resin or silicon material, or another material such as leather.

Figure 3:
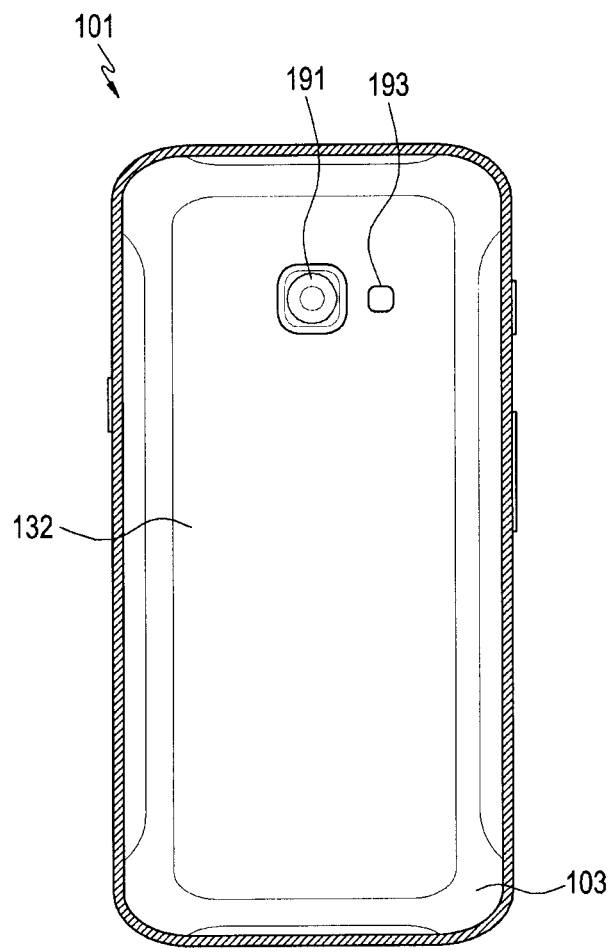
FIG. 3 is a rear view illustrating the electronic device according to an embodiment.

FIG. 3 is a rear view illustrating an electronic device (e.g., the electronic device 101 in FIG. 2) according to an embodiment.

Referring to FIG. 3, the housing (e.g., the housing 103 in FIG. 2) of the electronic device 101 according to an embodiment may include a second plate 132. The second plate 132 may face in a direction opposite the first plate (e.g., the first plate 131 in FIG. 2). According to one embodiment, a space may be formed between the first plate (e.g., the first plate 131 in FIG. 2) and the second plate 132. Various types of devices and/or components of the electronic device 101, such as the processor 120, the memory 130, the input/output interface 150, and the communication interface 170, which are described above, may be accommodated in the space, and a battery (not illustrated) may also be accommodated therein to function as a power source.

According to one embodiment, a second camera 191 and a flash 193 may be disposed on the rear face (e.g., the second plate 132) of the housing 103. According to one embodiment, a speaker (not illustrated) may also be disposed on the rear face (e.g., the second plate 132) of the housing 103.

Figure 4:
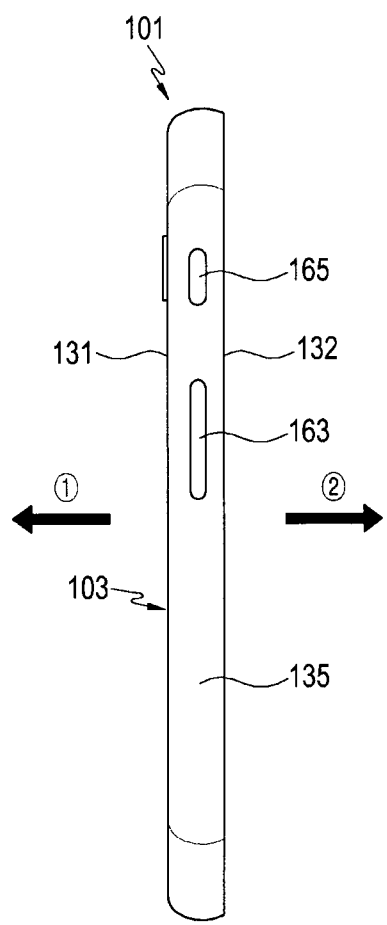
FIG. 4 is a left side view illustrating the electronic device according to an embodiment.

FIG. 4 is a left side view illustrating an electronic device (e.g., the electronic device 101 in FIG. 3) according to an embodiment.

Referring to FIG. 4, the housing 103 (e.g., the housing 103 in FIG. 3) of the electronic device (e.g., the electronic device 101 in FIG. 3) according to an embodiments may include side members. The side members may include a first side member 135 forming one side face of the housing 103. The first side member 135 may surround the space between the first plate (e.g., the first plate 131 in FIG. 2) and the second plate (e.g., the second plate 132 in FIG. 3). The first side member 135 may be attached to the second plate (e.g., the second plate 132 in FIG. 3) or may be an extension of the second plate (e.g., the second plate 132 in FIG. 3). According to one embodiment, when the first side member 135 is made of a metal, it can be utilized as an antenna radiator.

As described above, and as now shown in FIG. 4, according to one embodiment, the first plate 131 faces in a first direction ① and the second plate 132 faces in a second direction ② opposite the first direction ①.

Figure 5:
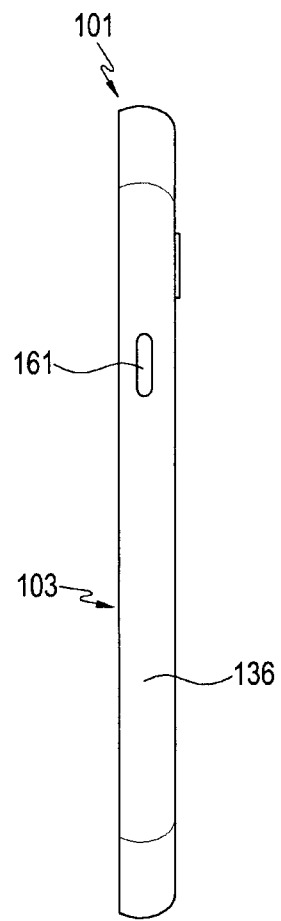
FIG. 5 is a right side view illustrating the electronic device according to an embodiment.

FIG. 5 is a right side view illustrating an electronic device (e.g., the electronic device 101 in FIG. 4) according to an embodiments.

Referring to FIG. 5, the housing (e.g., the housing 103 in FIG. 4) of the electronic device (e.g., the electronic device 101 in FIG. 4) according to an embodiments may include side members. The side members may include a second side member 136 facing away from the first side member (e.g., the first side member 135 in FIG. 4). The second side member 136 may surround the space between the first plate (e.g., the first plate 131 in FIG. 2) and the second plate (e.g., the second plate 132 in FIG. 3). The second side member 136 may be attached to the second plate (e.g., the second plate 132 in FIG. 3) or may be an extension of the second plate (e.g., the second plate 132 in FIG. 3). According to one embodiment, when the second side member 136 is made of a metal, it can be utilized as an antenna radiator.

Figure 6:
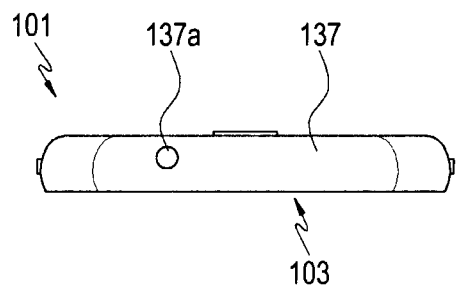
FIG. 6 is a top view illustrating the electronic device according to an embodiment.

FIG. 6 is a top view illustrating the electronic device (e.g., the electronic device 101 in FIG. 5) according to an embodiment.

Referring to FIG. 6, the housing 103 (e.g., the housing 103 in FIG. 5) of the electronic device (e.g., the electronic device 101 in FIG. 5) according to an embodiment may include side members. The side members may include a third side member 137 that connects the first side member (e.g., the first side member 135 in FIG. 4) and the second side member (e.g., the second side member 136 in FIG. 5) to each other. The third side member 137 may surround the space between the first plate (e.g., the first plate 131 in FIG. 2) and the second plate (e.g., the second plate 132 in FIG. 3). The third side member 137 may be attached to the second plate (e.g., the second plate 132 in FIG. 3) or may be an extension of the second plate (e.g., the second plate 132 in FIG. 3). According to one embodiment, when the third side member 137 is made of a metal, it can be utilized as an antenna radiator.

According to one embodiment, a connecting component (e.g., a connector 137a), into which an earphone jack is inserted may be disposed in the third side member 137.

Figure 7:
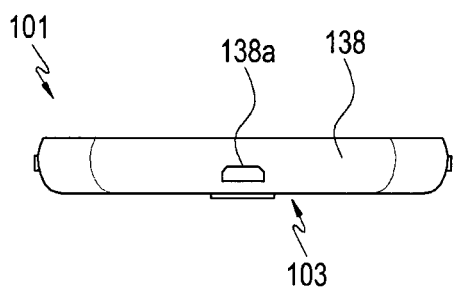
FIG. 7 is a bottom view illustrating the electronic device according to an embodiment.

FIG. 7 is a bottom view illustrating the electronic device (e.g., the electronic device 101 in FIG. 6) according to an embodiment.

Referring to FIG. 7, the housing 103 (e.g., the housing 103 in FIG. 6) of the electronic device (e.g., the electronic device 101 in FIG. 6) according to an embodiment may include side members. The side members may include a fourth side member 138 that connects the first side member (e.g., the first side member 135 in FIG. 4) and the second side member (e.g., the second side member 136 in FIG. 5) to each other. The fourth side member 138 may surround the space between the first plate (e.g., the first plate 131 in FIG. 2) and the second plate (e.g., the second plate 132 in FIG. 3). The fourth side member 138 may be attached to the second plate (e.g., the second plate 132 in FIG. 3) or may be an extension of the second plate (e.g., the second plate 132 in FIG. 3). According to one embodiment, when the fourth side member 138 is made of a metal, it can be utilized as an antenna radiator.

According to one embodiment, a connecting component (e.g., a connector 138a), which allows connection to an external device, may be disposed in the fourth side member 138.

Figure 8:
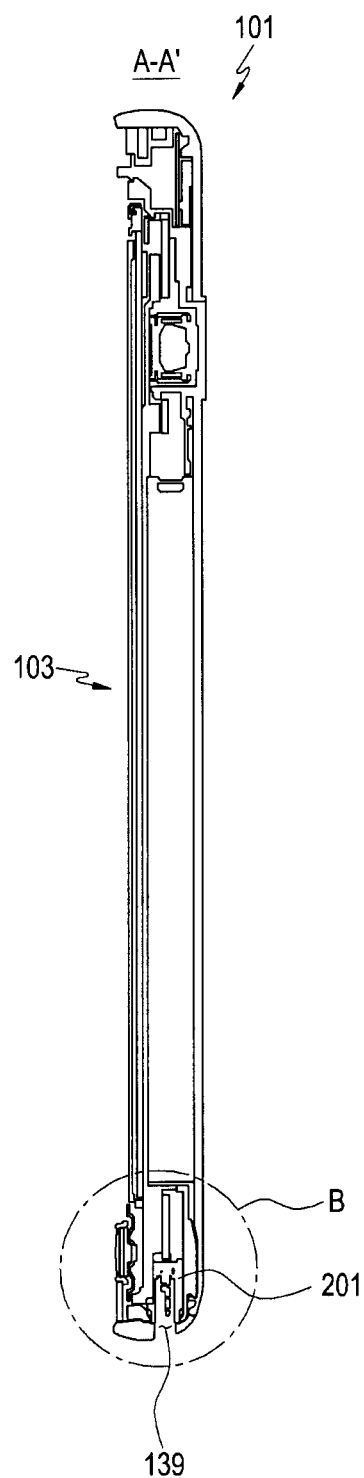
FIG. 8 is a cross-sectional view taken along line A-A' in FIG. 2.

FIG. 8 is a cross-sectional view taken along line A-A' in FIG. 2.

Referring to FIG. 8, a connecting component 201 (e.g., the connecting component 138a in FIG. 7) may be disposed inside the housing 103 (e.g., the housing 103 in FIG. 2) of the electronic device (e.g., the electronic device 101 in FIG. 2) according to an embodiment. The connecting component 201 may be a Universal Serial Bus (USB) connector. The connecting component 201 may be connected to an external device through an opening 139 formed in the fourth side member (e.g., the side member 138 in FIG. 2).

Figure 9:
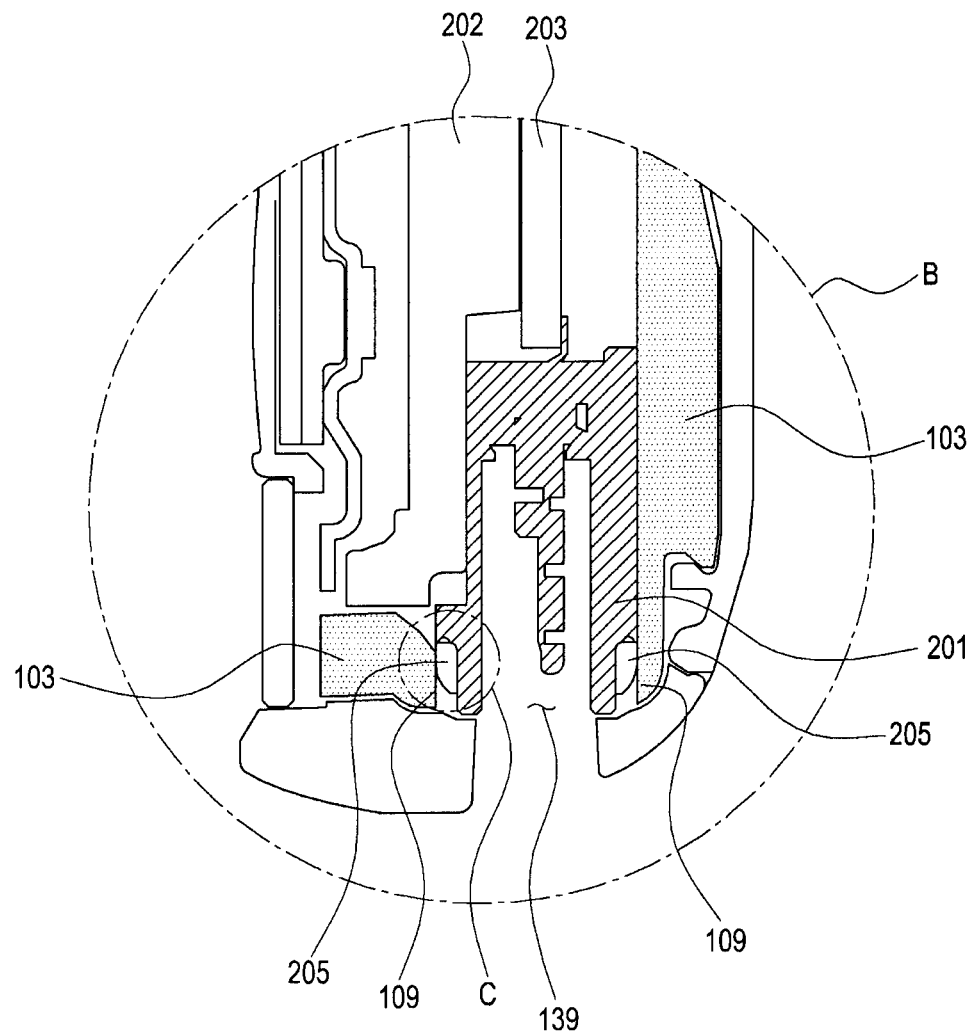
FIG. 9 is an enlarged view illustrating a portion indicated by "B" in FIG. 8.

FIG. 9 is an enlarged view illustrating a portion indicated by "B" in FIG. 8.

Referring to FIG. 9, a support member 202 and a circuit board 203 may be disposed inside the housing 103 (e.g., the housing 103 in FIG. 8) of the electronic device (e.g., the electronic device 101 in FIG. 8) according to an embodiment. The support member 202 may support a display (e.g., the display 160 in FIG. 1) disposed inside the housing 103 or may support the circuit board 203 or a battery (not illustrated). According to one embodiment, a connecting component (e.g., the connecting component 201 in FIG. 8) may be disposed between the support member 202 and the housing 103. According to one embodiment, the lower side face (e.g., the fourth side member 138) of the housing 103 may be provided with an opening 139 through which the connecting component is exposed to the outside of the electronic device 101. According to one embodiment, the housing 103 may include an inner wall 109 thereof adjacent to the opening 139.

According to one embodiment, the electronic device (e.g., electronic device 101 in FIG. 8) may include a waterproof device 205 that seals the gap between the connecting component 201 and the housing 103. When the waterproof device 205 seals the gap between the inner wall of the housing 103 and the connecting component 201, infiltration of foreign matter into the housing 103 through the opening 139 can be blocked.

Figure 10:
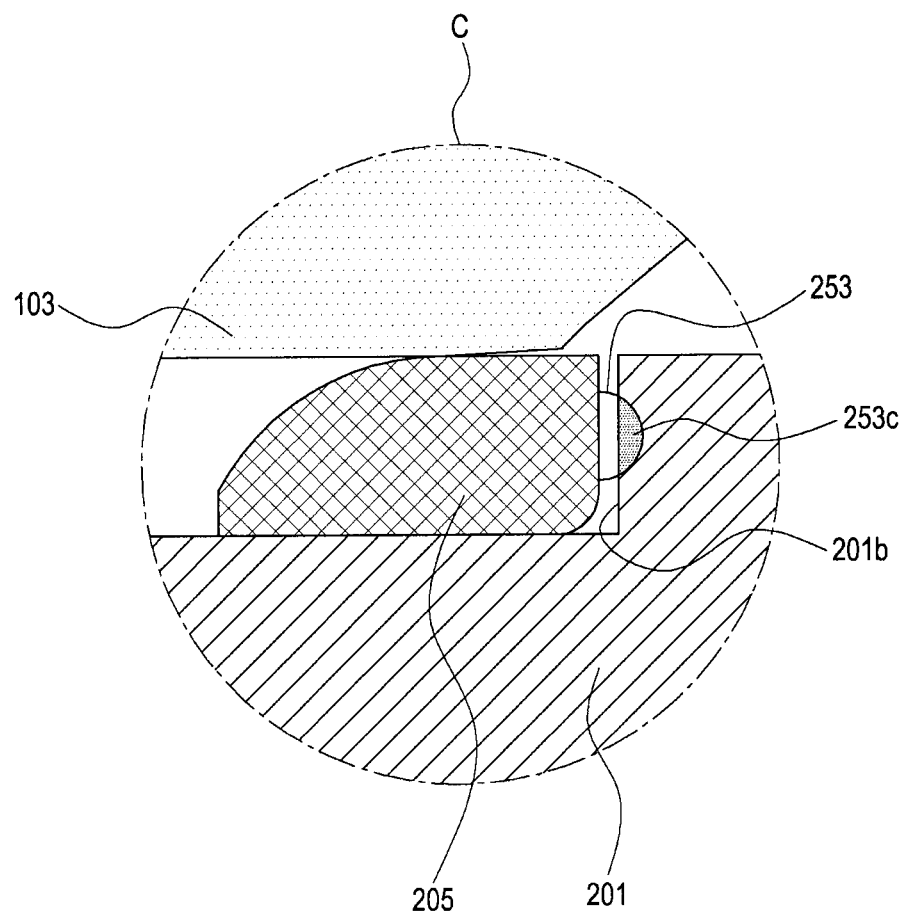
FIG. 10 is an enlarged view illustrating a portion indicated by "C" in FIG. 9.

FIG. 10 is an enlarged view illustrating a portion indicated by "B" in FIG. 9.

Referring to FIG. 10, the waterproof device 205 included in the electronic device (e.g., the electronic device 101 in FIG. 8) according to an embodiment may be in contact with the inner wall of the housing 103. The waterproof cover 205 may be made of resin, silicon, or another material such as urethane.

According to one embodiment, the waterproof device 205 may include a protrusion 253. The protrusion 253 may be in contact with the second face 201b of the connecting component 201. The protrusion 253 may include an overlap portion 253c that overlaps the second face 201b of the connecting component 201. For example, by overlapping the second face 201b, the overlap portion 253c of the protrusion 253 may seal a gap between the waterproof device 205 and the second face 201b while being maintained in a state of compression between the waterproof device 205 and the second face 201b by the elastic force of the overlap portion 253c of the protrusion 253. Conventionally, the waterproof device may be bonded to the connecting component 201 using an adhesive to maintain the sealed state. However, according to an embodiment of the present disclosure, the waterproof device 205 is able seal the gap between the waterproof device 205 and the connecting component 201 using the protrusion 253 without having to be bonded to the connecting component 201.

Figure 11:
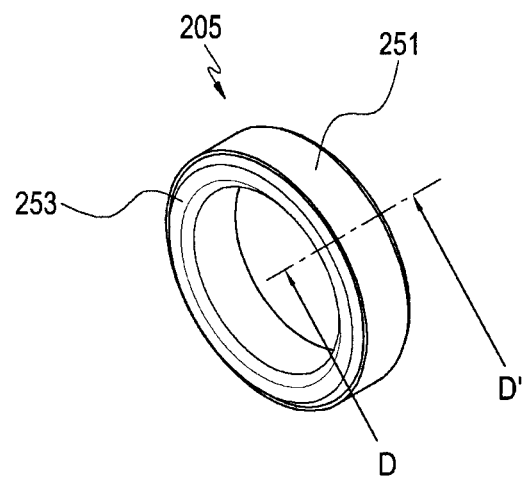
FIG. 11 is a perspective view illustrating a waterproof device included in an electronic device according to one of an embodiment.
Figure 12:
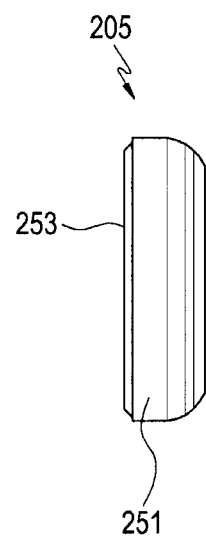
FIG. 12 is a side view illustrating the waterproof device included in the electronic device according to an embodiment.
Figure 13:
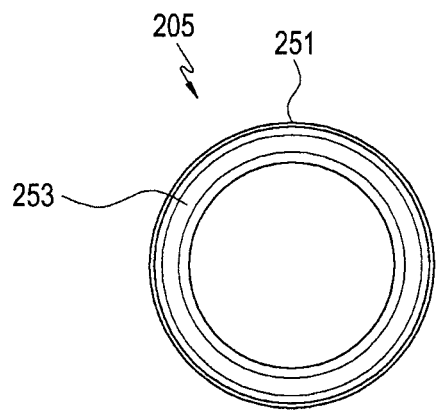
FIG. 13 is a front view illustrating the waterproof device included in the electronic device according to an embodiment.
Figure 14:
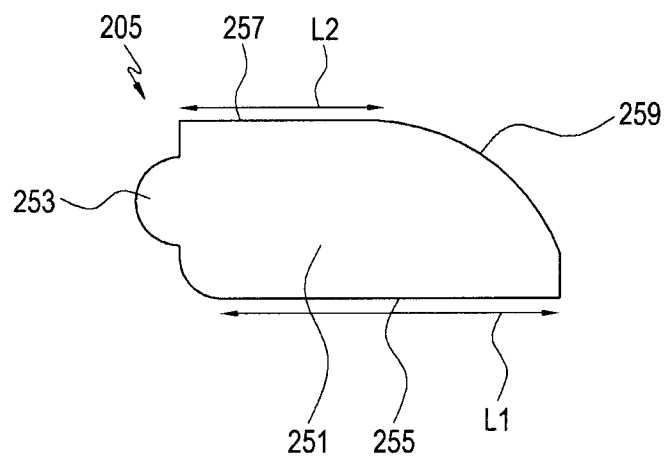
FIG. 14 is a cross-sectional view taken along line D-D' in FIG. 11.

FIG. 11 is a perspective view illustrating a waterproof device (e.g., the waterproof device 205 in FIG. 9) included in the electronic device (e.g., the electronic device 101 of FIG. 8) according to an embodiment. FIG. 12 is a side view illustrating the waterproof device included in the electronic device according to an embodiment. FIG. 13 is a front view illustrating the waterproof device included in the electronic device according to an embodiment. FIG. 14 is a cross-sectional view taken along line D-D' in FIG. 11.

Referring to FIGS. 11 to 14, a waterproof device 205 included in the electronic device (e.g., electronic device 101 of FIG. 8) according to an embodiment may include a body portion 251, a protrusion 253, a first planar portion 255, a second planar portion 257, and a seal portion 259. According to one embodiment, the body portion 251 may be in a closed curve shape.

According to one embodiment, the protrusion 253 may be formed to extend and protrude from a first face of the body portion 251. The protrusion 253 may have a cross-sectional area that is smaller than that of the first face of the body portion 251. According to one embodiment, the protrusion 253 may be in a closed curve shape, whose radius is smaller than that of the body portion 251. The protruding direction of the protrusion 253 may be a direction toward the second face (e.g., the second face 201b in FIG. 10) of the connecting component (e.g., the connecting component 201 in FIG. 10). For example, the protruding direction of the protrusion 253 may be a direction parallel to the opening (e.g., the opening 139 in FIG. 9).

According to one embodiment, the first planar portion 255 may be formed on the body portion 251. The first planar portion 255 may be a planar face having a first width L1. For example, the first width L1 may be about 1 mm to 1.4 mm. According to one embodiment, the first width L1 may be about 1.2 mm.

According to one embodiment, the second planar portion 257 may be formed on the body portion 251 opposite the first planar portion 255. The second planar portion 257 may be a planar face having a second width L2 shorter than the first width L1. For example, the second width L2 may be about 0.3 mm to 0.7 mm. According to one embodiment, the second width L2 may be about 0.5 mm. According to one embodiment, the distance between first planar portion 255 and the second planar portion 257 may be about 0.45 mm to 0.85 mm.

According to one embodiment, the sealing portion 259 may extend from the first planar portion 255 to connect to the second planar portion 257. According to one embodiment, at least a part of the sealing portion 259 may be located on the body portion 251 opposite the protrusion 253. In this embodiment, another part of the sealing portion 259 may be located on the body portion 251 opposite the first planar portion 255. The sealing portion 259 may be rounded, tapered, inclined, etc.

Figure 15:
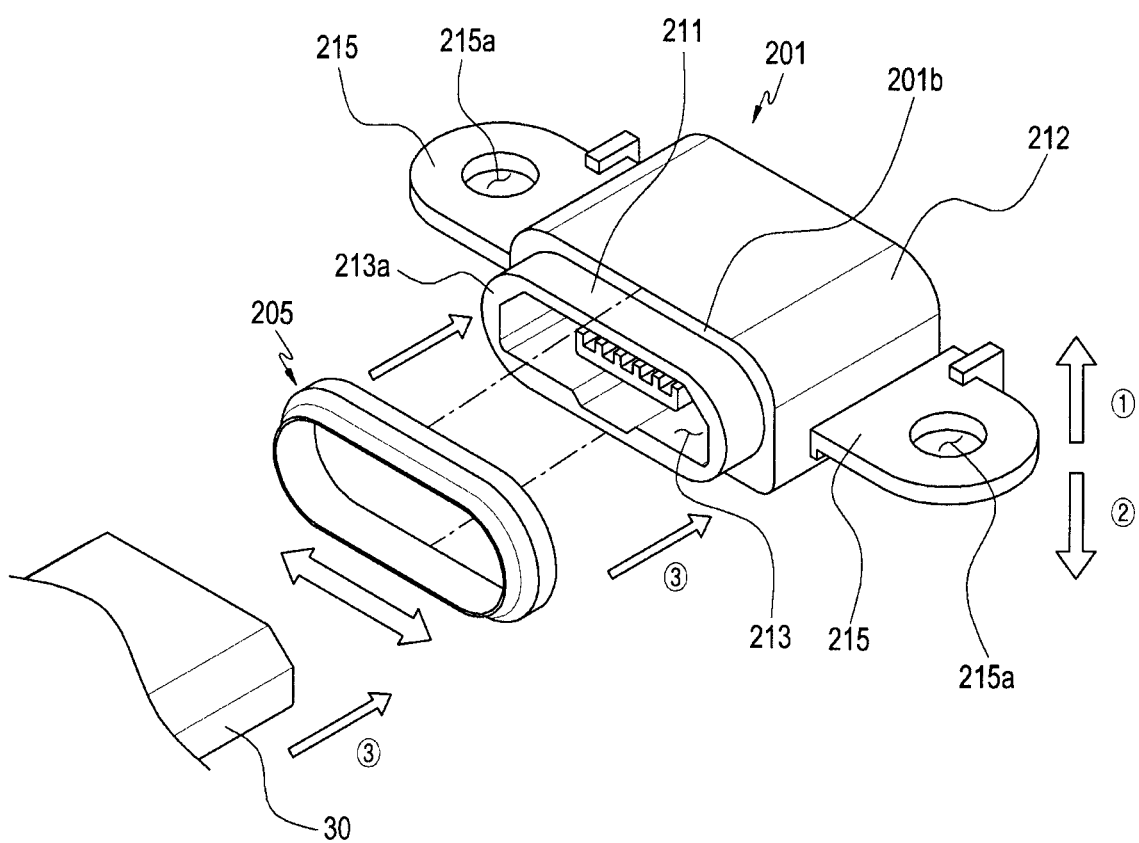
FIG. 15 is a perspective view illustrating the waterproof device included in the electronic device according to an embodiment coupling to a connecting component.

FIG. 15 is a perspective view illustrating a waterproof device (e.g., the waterproof device 205 in FIG. 14) included in the electronic device (e.g., the electronic device 101 of FIG. 8) according to an embodiment coupling to a connecting component 201.

Referring to FIG. 15, the connecting component 201 may include a case 212 in which an insertion hole 213 is formed. The case 212 may be the exterior of the connecting component 201 and may include a connection terminal that can be connected to a terminal of the external device 30. The connection terminal may be electrically connected to a circuit board (e.g., the circuit board 203 of FIG. 9). A part of the external device 30 may be received in the case 212 through the insertion hole 213 in a third direction ③ that is perpendicular to the first direction ① and the second direction ②. Thus, the external device 30 may be electrically connected to the circuit board (e.g., the circuit board 203 in FIG. 9) via the connecting component 201. According to one embodiment, the case 212 may be made with resin and/or metallic materials.

According to one embodiment, the connecting component 201 may include a peripheral portion 213a surrounding the insertion hole 213. The peripheral portion 213a may extend and protrude from the case 212 in the direction opposite the third direction ③. The peripheral portion 213a may guide the part of the external device 30 when it is inserted into the insertion hole 213. In one embodiment, the outer peripheral face of the peripheral portion 213a may also be referred to as the first face 211 of the connecting component 201.

According to one embodiment, the connecting component 201 may include one or more flanges 215 protruding from the case 212. The one or more flanges 215 may be connected to the circuit board (e.g., the circuit board 203 of FIG. 9) or the housing (e.g., the housing 103 of FIG. 9). The one or more flanges 215 may each include a coupling hole 215a. The one or more flanges 215 may be coupled to the circuit board (e.g., the circuit board 203 in FIG. 9) or the housing (e.g., the housing 103 in FIG. 9) using coupling units (not illustrated) such as bolts. Accordingly, because the one or more flanges 215 are coupled to the circuit board (e.g., the circuit board 203 in FIG. 9) or the housing (e.g., the housing 103 in FIG. 9), the connecting component 201 does not move excessively in the third direction ③ when part of the external device 30 is inserted into the insertion hole 213. As the one or more flanges 215 are coupled to the circuit board (e.g., the circuit board 203 in FIG. 9) or the housing (e.g., the housing 103 in FIG. 9), electrical connection between the connecting component 201 and the circuit board (e.g., the circuit board 203 in FIG. 9) can be stably maintained.

According to one embodiment, the waterproof device 205 may be made of various materials having elastic properties, such as rubber, silicon, urethane, etc. As the waterproof device 205 is elastic, by applying an external force, the waterproof device 205 may be deformed so that its shape corresponds to that of the peripheral portion 213a. The waterproof device 205 may be coupled to the peripheral portion 213a to surround the outer peripheral surface of the peripheral portion 213a. According to one embodiment, the protrusion (e.g., the protrusion 253 in FIG. 14) of the waterproof device 205 protrudes in the direction parallel to the insertion direction of the external device 30, which is the third direction ③. The protrusion 253 (e.g., the protrusion 253 in FIG. 14) of the waterproof device 205 may come into contact with the second face 201b of the connecting component 201. The second face 201b of the connecting component 201 may be disposed in a direction perpendicular to the first face 211 of the connecting component 201. According to one embodiment, the second face 201b of the connecting component 201 may be parallel to the first direction ① and the second direction ②.

Figure 16:
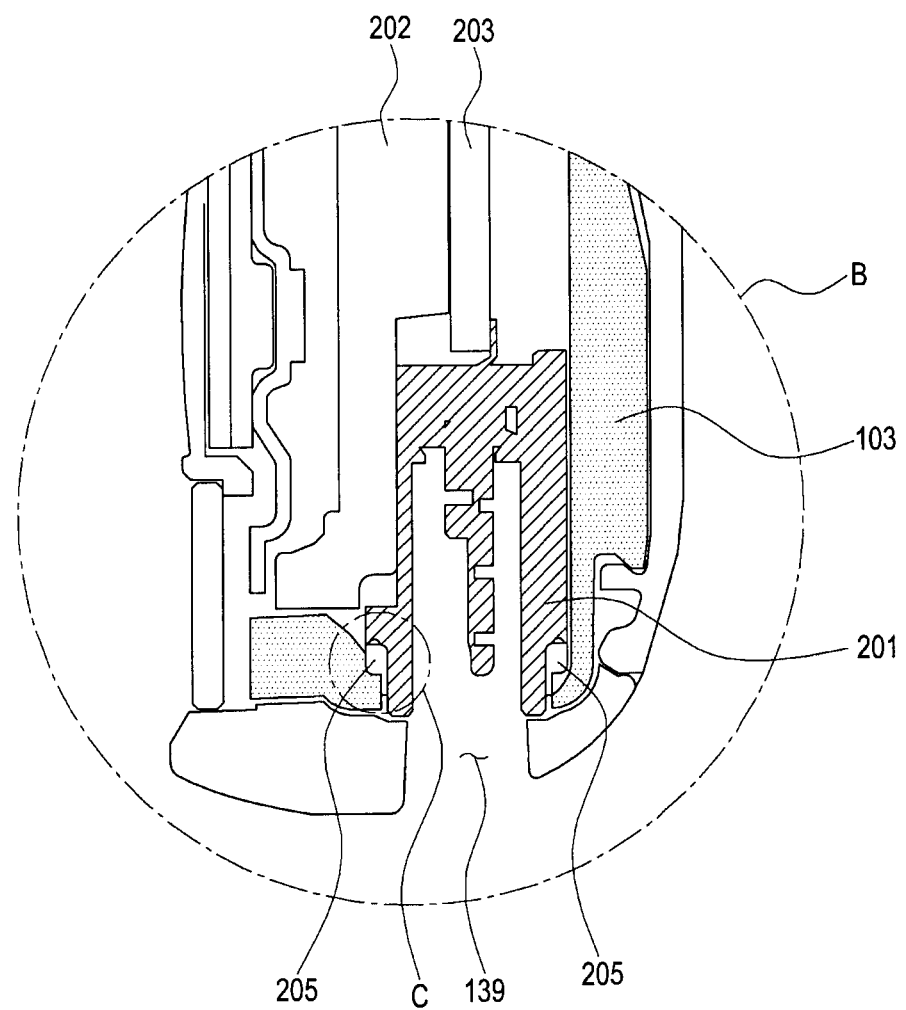
FIG. 16 is an enlarged view illustrating a portion indicated by "B" in FIG. 8 in another embodiment of the present disclosure.
Figure 17A:
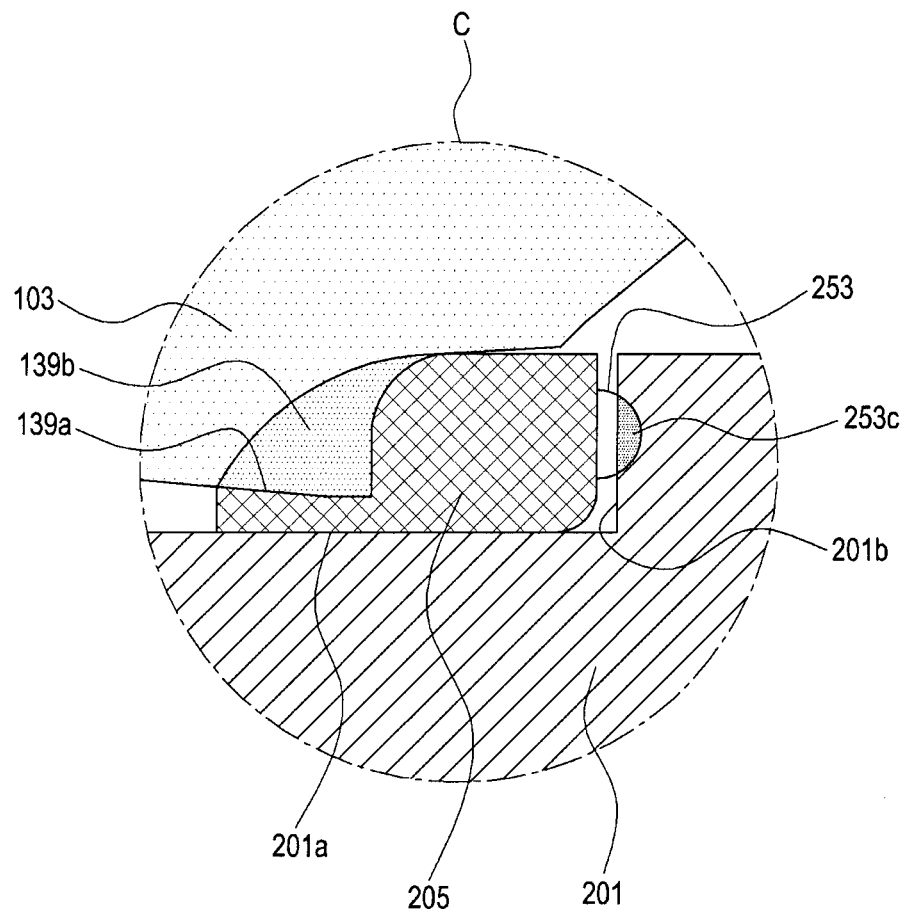
FIG. 17A is an enlarged view illustrating a portion indicated by "C" in FIG. 16.
Figure 17B:
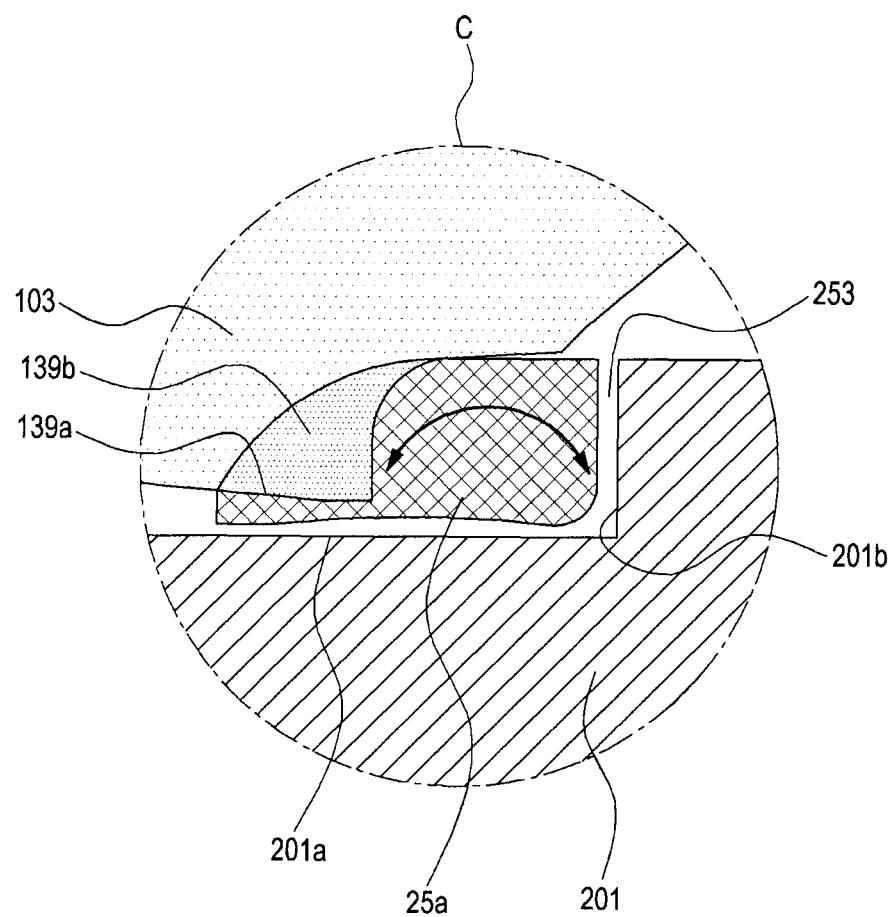
FIG. 17B, FIG. 17C and FIG. 17D are views each illustrating a conventional waterproof device.
Figure 17C:
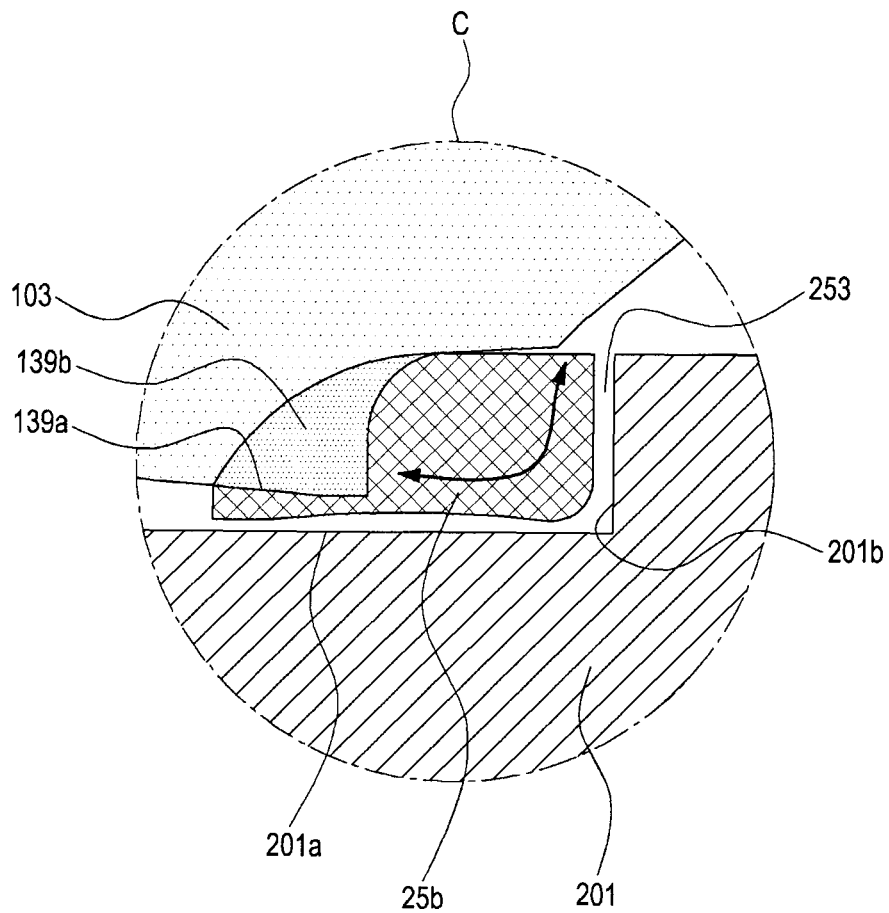
Figure 17D:
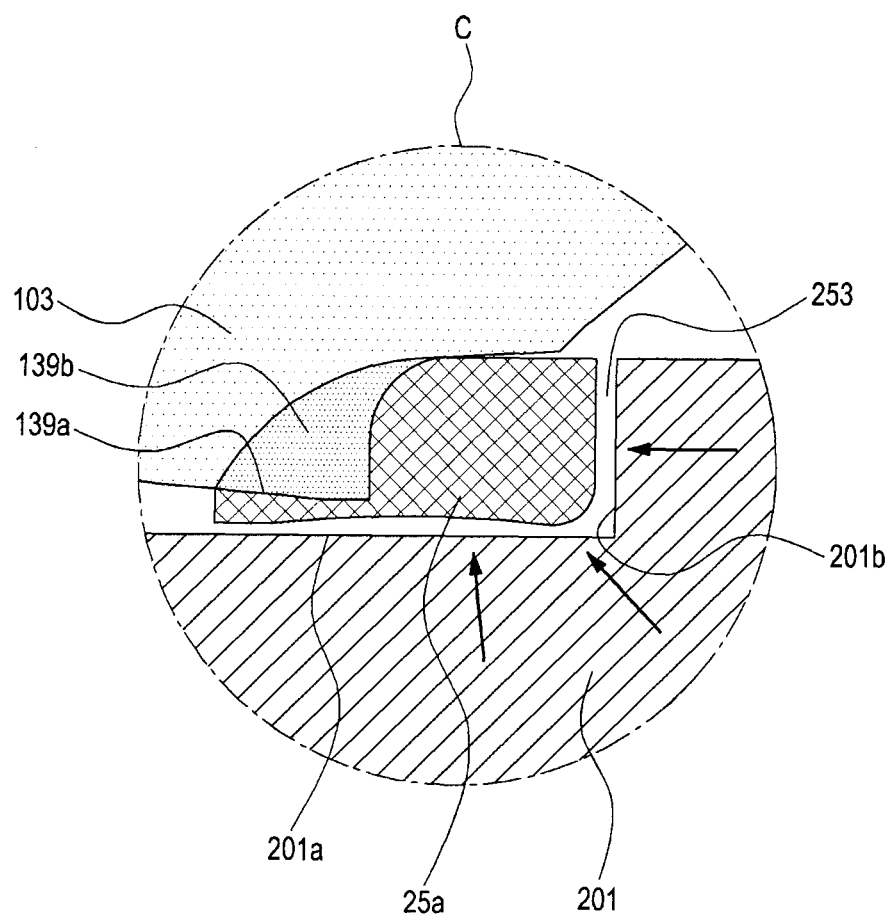

FIG. 16 is an enlarged view illustrating a portion indicated by "B" in FIG. 8 in another embodiment of the present disclosure. FIG. 17A is an enlarged view illustrating a portion indicated by "C" in FIG. 16. FIGS. 17B to 17D are views each illustrating a conventional waterproof device.

Referring to FIG. 16 and FIGS. 17A to 17D, a housing 103 of an electronic device (e.g., the electronic device 101 in FIG. 13) according to an embodiment may include a contact portion 139a. The contact portion 139a may extend from an inner wall of the housing 103 and may protrude toward the opening 139. The waterproof device 205 may be in contact with the contact portion 139a of the housing 103. For example, since the waterproof device 205 has elasticity, the waterproof device 205 may be in contact with the contact portion 139a of the housing 103 and be pressed by the contact portion 139a of the housing 103, so that the gap between the housing 103 and the waterproof device 205 can be sealed. According to one embodiment, the waterproof device 205 may overlap the contact portion 139a of the housing 103. For example, the waterproof device 205 may be held in place and be pressed by the contact portion 139a of the housing 103 when the waterproof device 205 overlaps with the overlap portion 139b of the contact portion 139a.

Referring to FIGS. 17B to 17D, the waterproof device according to an embodiment and a conventional waterproof device are compared as follows.

In the process of assembly, when coupled to the connecting component 201, the conventional waterproof device 25a, 25b, or 25c may be deformed in various directions. This may be due to assembly deviations in the direction in which assembly occurs, where the waterproof device 25a, 25b, or 25c are initially placed, compressive forces applied to the waterproof device 25a, 25b, or 25c by the housing 103, etc. Depending on the deformed shape of the conventional waterproof device 25a, 25b, or 25c, gaps may occur between the conventional waterproof device 25a, 25b, or 25c and the connecting component 201, so that foreign matter may be introduced into the gap between the connecting component 201 and the conventional waterproof device 25a, 25b, or 25c. In order to solve such a problem, the waterproof device 205 disclosed herein includes a protrusion 253 protruding toward the connecting component 201, so that the gap between the waterproof device 205 and the connecting component 201 can be sealed.

Figure 18:
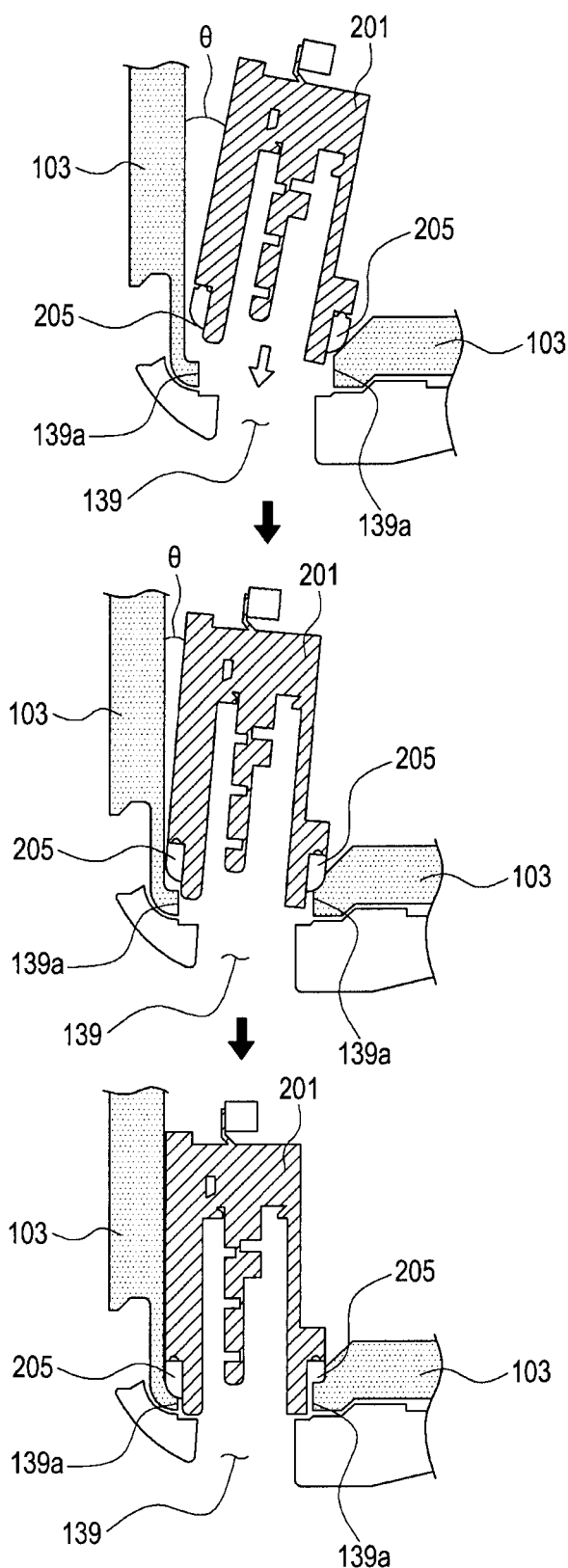
FIG. 18 are cross-sectional views illustrating a connecting component coupling to the electronic device according to an embodiment.

FIG. 18 are cross-sectional views illustrating a connecting component (e.g., the connecting component 201 in FIG. 17) coupling to an electronic device (e.g., the electronic device 101 of FIG. 8) according to an embodiment.

Referring to FIG. 18, a process of coupling the connecting component 201 to the electronic device (e.g., the electronic device 101 of FIG. 8) will be described. A part of the connecting component 201 may be inserted into the opening 139 inside the housing (e.g., the housing 103 of FIG. 17) of the electronic device (e.g., the electronic device 101 of FIG. 8). During the initial insertion, the connecting component 201 may be positioned at a first angle θ with respect to the housing 103.

According to one embodiment, the sealing portion (e.g., the sealing portion 259 in FIG. 14) of the waterproof device 205 may be inserted toward the contact portion 139a of the housing 103.

The connecting component 201 may then be continuously moved into the opening 139 while being in contact with a part of the housing 103. The sealing portion (e.g., the sealing portion 259 in FIG. 14) of the waterproof device 205 may come into contact with the contact portion 139a of the housing 103 while being pressed by the contact portion 139a of the housing 103.

As the connecting component 201 is coupled to the contact portion 139a of the housing 103, the sealing portion (e.g., the sealing portion 259 in FIG. 14) of the waterproof device 205 is able to seal the gap between the contact portion 139a of the housing 103 and the connecting component 201.

Figure 19:
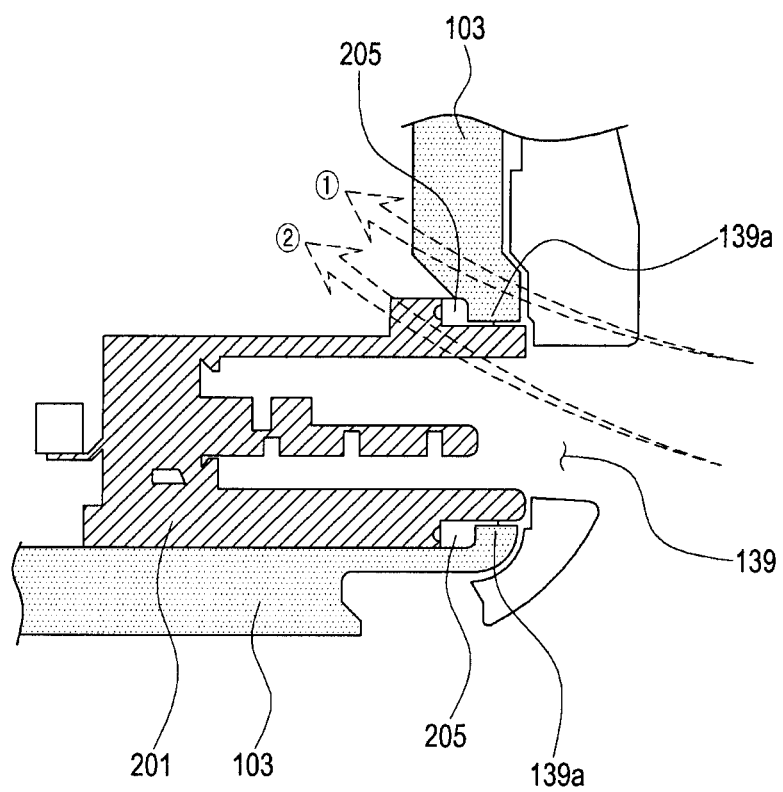
FIG. 19 is a cross-sectional view illustrating how the waterproof device included in the electronic device blocks infiltration of foreign matter according to an embodiment.

FIG. 19 is a perspective view illustrating how a waterproof device (e.g., the waterproof device 205 in FIG. 18) included in the electronic device (e.g., the electronic device 101 of FIG. 8) blocks the introduction of foreign matter according to an embodiment.

Referring to FIG. 19, foreign matter may be introduced into the opening 139 from the outside of the housing 103. Since the sealing portion 259 (e.g., the sealing portion 259 in FIG. 5) of the waterproof device 205 seals the gap between the contact portion 139a of the housing 103 and the waterproof device 205, the introduction of the foreign matter ① into the housing 103 can be blocked.

According to one embodiment, since the protrusion (e.g., the protrusion 253 in FIG. 17) of the waterproof device 205 comes into contact with the second face (e.g., the second face 201b in FIG. 17) of connecting component 201, the introduction of the foreign matter ② into the housing 103 can also be blocked. For example, by overlapping the second face 201b (the second face 201b in FIG. 17), a part of the protrusion 253 (e.g., the overlap portion 253c in FIG. 10) is maintained in a pressed state between the waterproof device 205 and the second face 201b by an elastic force, so that the gap between the waterproof device 205 and the second face 201b can be sealed. The conventional waterproof device bonds to the connecting component 201 using an adhesive. However, according to one or more embodiments disclosed herein, the waterproof device 205 is able seal the gap between the waterproof device 205 and the connecting component 201 by the protrusion 253, and no adhesives or bonding are required.

Figure 20:
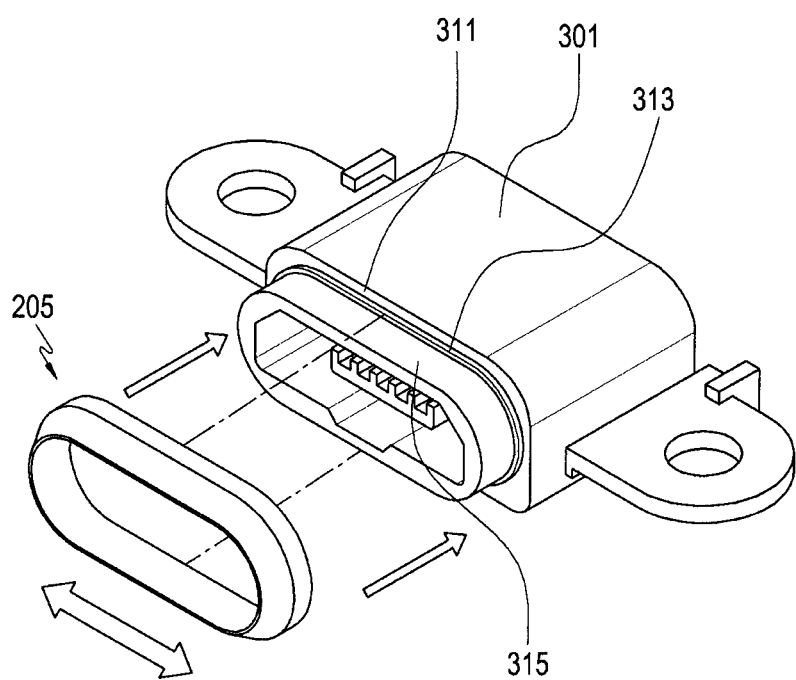
FIG. 20 is a perspective view illustrating the waterproof device included in the electronic device coupling to a connecting component according to an embodiment.

FIG. 20 is a perspective view illustrating a waterproof device (e.g., the waterproof device 205 in FIG. 19) included in an electronic device (e.g., the electronic device 101 of FIG. 13) coupling to a connecting component (e.g., the connecting component 201 in FIG. 19) according to an embodiment.

Referring to FIG. 20, the connecting component 301 may include a third protrusion 313, which protrudes from the second face 311. As the waterproof device 205 is coupled with the connecting component 301 while enclosing the outer circumferential face of the peripheral portion 315, the third protrusion 313 is able to come into contact with one face of the waterproof device 205.

Figure 21:
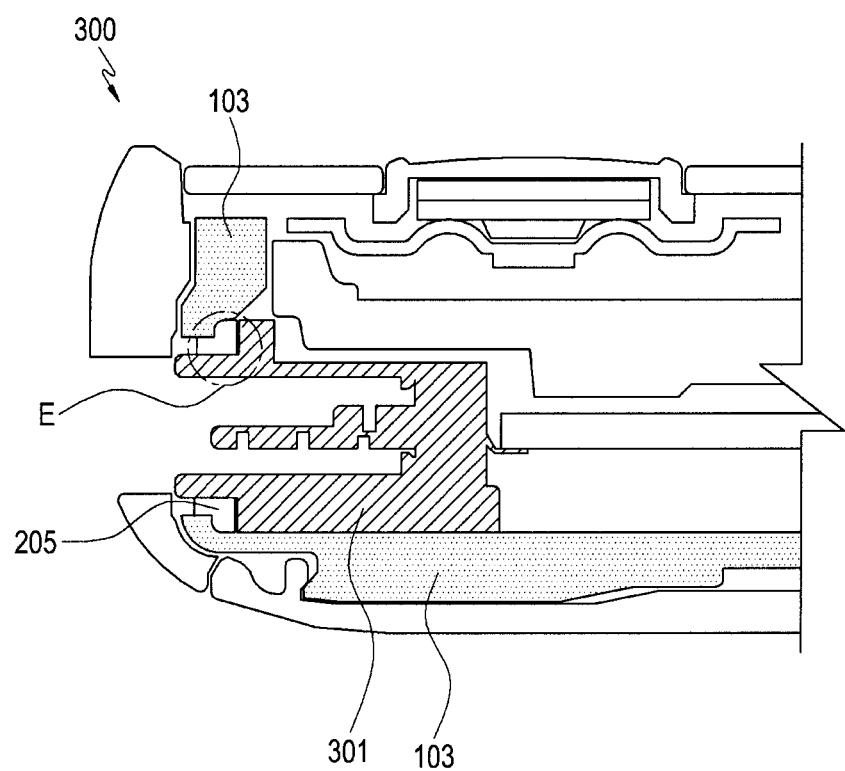
FIG. 21 is a cross-sectional view illustrating the waterproof device included in the electronic device coupling to a connecting component according to an embodiment.
Figure 22:
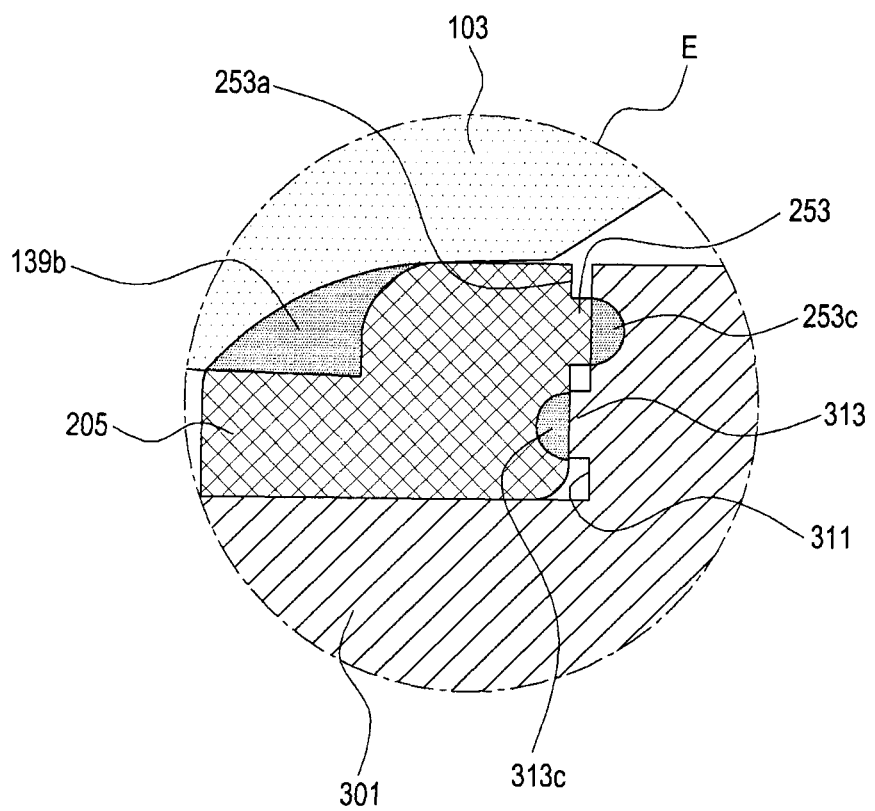
FIG. 22 is an enlarged view illustrating a portion indicated by "E" in FIG. 21.

FIG. 21 is a cross-sectional view illustrating a waterproof device (e.g., the waterproof device 205 in FIG. 20) included in an electronic device (e.g., the electronic device 101 of FIG. 13) coupling to a connecting component (e.g., the connecting component 301 in FIG. 20) according to an embodiment. FIG. 22 is an enlarged view illustrating a portion indicated by "E" in FIG. 21.

Referring to FIGS. 21 and 22, the third protrusion 313 of the connecting component 301 may come into contact with one face 253a of the waterproof device 205. The protrusion 253 of the waterproof device 205 may come into contact with the second face 311 of the connecting component. The third protrusion 313 may protrude from the second face 311 of the connecting component 301 so as not to overlap the protrusion 253. The protrusion 253 and the third protrusion 313 are able to block the introduction of foreign matter through the gap between the waterproof device 205 and the connecting component 301.

Figure 23:
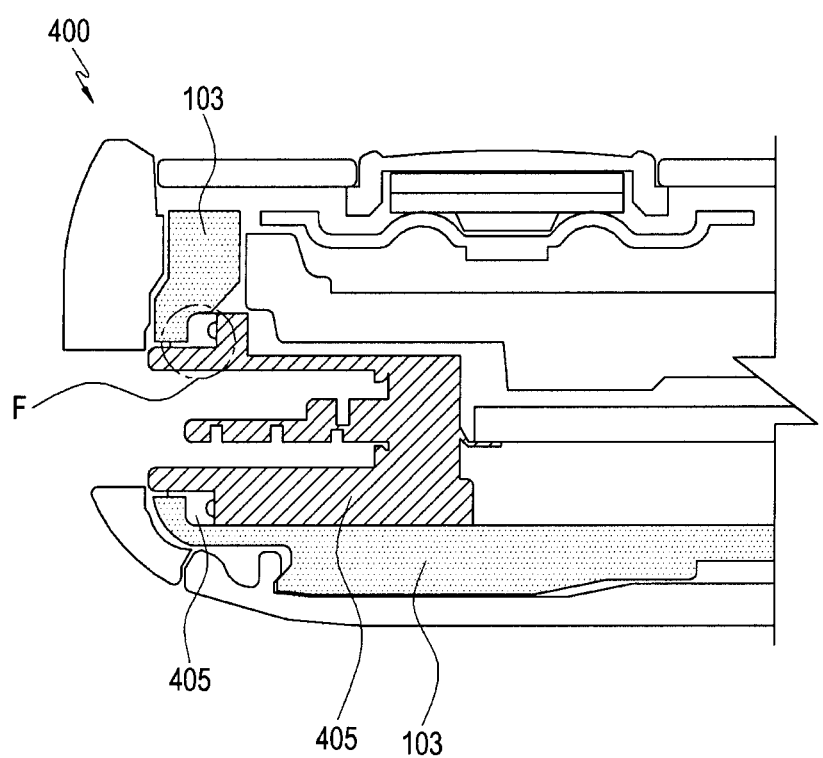
FIG. 23 is a cross-sectional view illustrating the waterproof device included in the electronic device coupling to a connecting component according to an embodiment.
Figure 24:
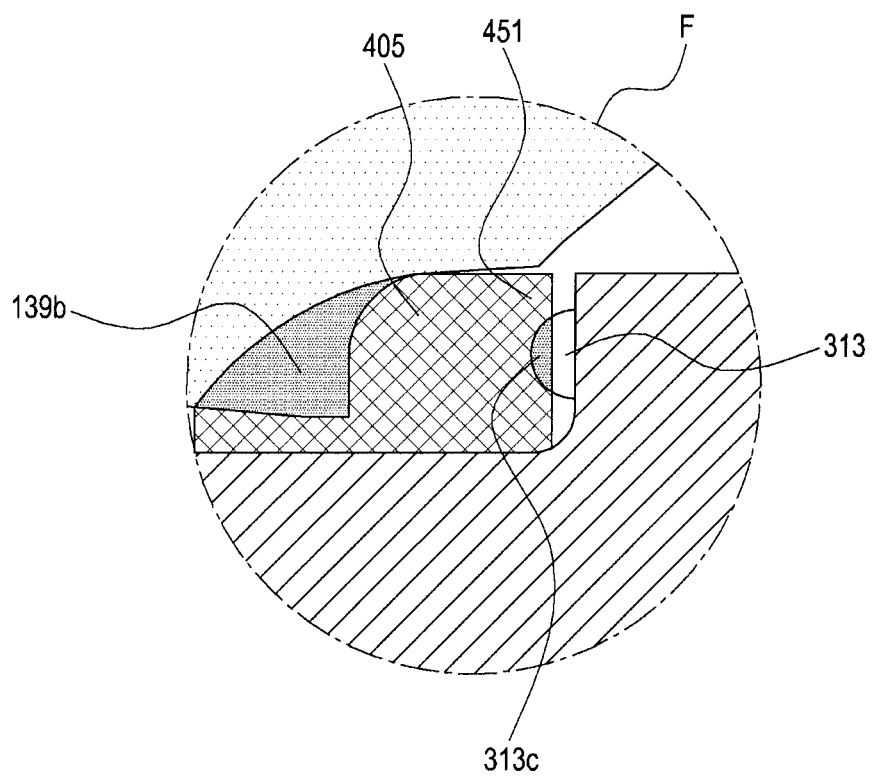
FIG. 24 is an enlarged view illustrating a portion indicated by "F" in FIG. 23.

FIG. 23 is a cross-sectional view illustrating the waterproof device 405 included in an electronic device (e.g., the electronic device 101 of FIG. 13) coupling to a connecting component (e.g., the connecting component 301 in FIG. 22) according to an embodiment. FIG. 24 is an enlarged view illustrating a portion indicated by "F" in FIG. 23.

Referring to FIGS. 23 and 24, the connecting component 301 may include a third protrusion 313, which protrudes from the second face 311. As the waterproof device 205 is coupled with the connecting component 301 while enclosing the outer circumferential face of the peripheral portion 315, the third protrusion 313 is able to come into contact with one face 451 of the waterproof device 405. The third protrusion 313 is able to block the introduction of foreign matter through the gap between the waterproof device 205 and the connecting component 301.

According to one embodiment, the one face 451 of the waterproof device 405 may be flat. For example, the one face 451 of the waterproof device 405 may not include a structure protruding toward the connecting component 301.

Figure 25:
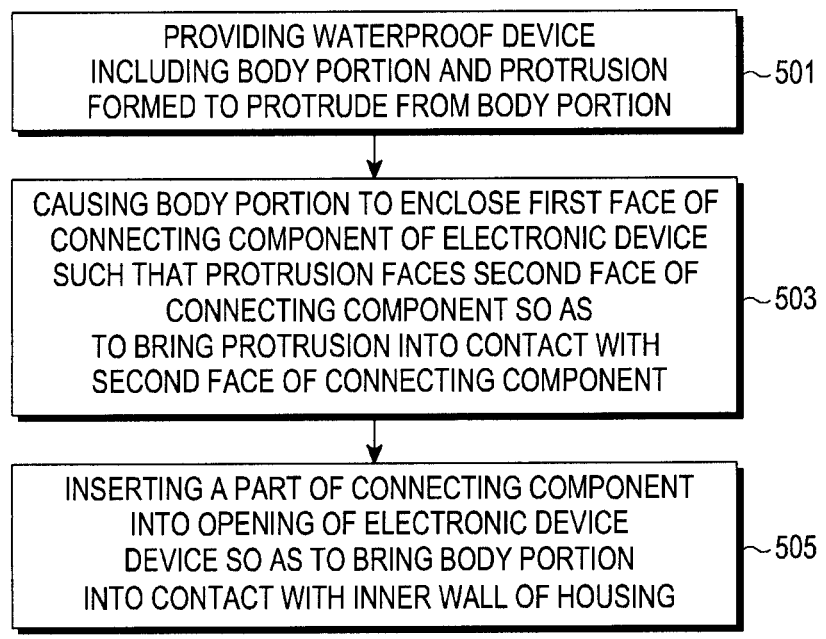
FIG. 25 is a flowchart illustrating a manufacturing method of the electronic device that includes a waterproof device according to an embodiment.

FIG. 25 is a flow chart illustrating how a waterproof device (e.g., the waterproof device 205 in FIG. 14) is assembled to an electronic device (e.g., the electronic device 101 in FIG. 8) according to an embodiment.

Referring to FIG. 25, a method of assembling a waterproof device (e.g., the waterproof device 205 in FIG. 18) to an electronic device (e.g., the electronic device 101 in FIG. 13) may include: an operation of providing a waterproof device (e.g., the waterproof device 205 in FIG. 18) having a body portion (e.g., the body portion 251 in FIG. 5) and a protrusion (the protrusion 253 in FIG. 18) protruding from the body portion (e.g., the body portion 251 in FIG. 5) (operation 501); an operation of causing the body portion (e.g., the body portion 251 in FIG. 5A) to enclose a first face of a connecting component (e.g., the connecting component 201 in FIG. 18) of the electronic device such that the protrusion (the protrusion 253 in FIG. 5) faces a second face (e.g., the second face 201b in FIG. 17) of the connecting component (e.g., the connecting component 201 in FIG. 18) and to come into contact with the second face of the connecting component (the connecting component 201 in FIG. 18A) (operation 503); and bringing the body portion (e.g., the body portion 251 in FIG. 5) into contact with an inner wall of the housing by aligning a part of the connecting component (the connecting component 201 in FIG. 18) to an opening (e.g., the opening 139 in FIG. 16) of the electronic device (operation 505).

As described above, according to one embodiment, a connecting component with a waterproof device may include: a case having an insertion hole into which a part of an external device is inserted; and the waterproof device may include: a body portion disposed to surround a peripheral portion of the insertion hole; and a protrusion extending from the body portion and protruding in a direction parallel to an insertion direction of the external device.

According to one embodiment, the waterproof device may have a closed loop shape.

According to one embodiment, the body portion may have a sealing portion formed to be rounded, tapered, or inclined.

According to one embodiment, the connecting component may further include at least one flange extending and protruding from the case.

According to one embodiment, the peripheral portion may be formed to extend and protrude from the case, and the waterproof device may be seated along an outer circumferential face of the peripheral portion.

According to one embodiment, the protrusion may be formed to protrude from a first face of the body portion.

According to one embodiment, an electronic device may include: a housing including a first plate facing in a first direction, a second plate facing in a second direction opposite the first direction, and a side member surrounding a space between the first plate and the second plate; an opening formed in the side member; a connecting component located in the space and configured to connect to an external device through the opening; a waterproof device configured to seal a gap between the connecting component and an inner wall of the housing. The waterproof device may include a body portion enclosing a first face of the connecting component and being in contact with the inner wall of the housing, and a protrusion extending and protruding from the body portion and in contact with a second face of the connecting component.

According to one embodiment, the second face may be parallel to the first direction and the second direction.

According to one embodiment, the waterproof device may not be bonded to the connecting component.

According to one embodiment, the housing may include a contact portion disposed adjacent to the opening and in contact with the body portion of the waterproof device.

According to one embodiment, the waterproof device may include a sealing portion configured to seal a gap between the inner wall of the housing and the body portion when the sealing portion is in contact with the contact portion.

According to one embodiment, the sealing portion may be formed to be rounded, tapered, or inclined.

According to one embodiment, the body portion and the protrusion may be made of resin, silicon, and/or urethane.

According to one embodiment, the body portion may be formed in a closed curve shape.

According to one embodiment, the protrusion may be formed to protrude along a first face of the body portion.

According to one embodiment, the waterproof device may include a first planar portion corresponding to the first face of the connecting component.

According to one embodiment, the connecting component may be a Universal Serial Bus (USB) connector.

According to one embodiment, the first face of the connecting component may include a peripheral portion, and the first planar portion of the waterproof device may be seated on the peripheral portion.

According to one embodiment, a method of assembling a waterproof device in an electronic device may include: providing a waterproof device including a body portion and a protrusion formed to protrude from the body portion; causing the body portion to enclose a first face of a connecting component of the electronic device such that the protrusion faces a second face of the connecting component and is in contact with the second face of the connecting component; and bringing the body portion into contact with an inner wall of a housing of the electronic device by aligning a part of the connecting component to an opening of the electronic device.

According to one embodiment, the housing may include a contact portion disposed adjacent to the opening and configured to be in contact with the body portion.

While the present disclosure has been shown and described with reference to certain embodiments thereof, it will be understood by those skilled in the art that various changes in form and details may be made therein without departing from the spirit and scope of the present disclosure as defined by the appended claims.

What is claimed is:

1. A connecting component with a waterproof device, the connecting component comprising:
   a case having an insertion hole into which a part of an external device is inserted; and
   the waterproof device comprising:
   a body portion disposed to surround a peripheral portion of the insertion hole; and
   a protrusion extending from the body portion and protruding in a direction parallel to an insertion direction of the external device,
   wherein the waterproof device comprises a first planar portion formed on the body ion, and a second planar portion formed on the body portion opposite the first planar portion, wherein the protrusion is formed to protrude from a first face of the body portion, which is extended from the first planar portion to the second planar portion.

2. The connecting component of claim 1, wherein the waterproof device has a closed loop shape.

3. The connecting component of claim 1, wherein the body portion has a sealing portion formed to be rounded, tapered, or inclined.

4. The connecting component of claim 1, further comprising at least one flange extending and protruding from the case.

5. The connecting component of claim 4, wherein the peripheral portion is formed to extend and protrude from the case, and
   the waterproof device is seated along an outer circumferential face of the peripheral portion.

6. The connecting component of claim 1, wherein the protrusion is formed to protrude from a first face of the body portion.

7. An electronic device comprising:
   a housing including a first plate facing in a first direction, a second plate facing in a second direction opposite the first direction, and a side member surrounding a space between the first plate and the second plate;
   an opening formed in the side member;
   a connecting component located in the space and configured to connect to an external device through the opening; and
   a waterproof device configured to seal a gap between the connecting component and an inner wall of the housing,
   wherein the waterproof device comprises a body portion enclosing a first face of the connecting component and being in contact with the inner wall of the housing, and a protrusion extending and protruding from the body portion and in contact with a second face of the connecting component, wherein the waterproof device comprises a first planar portion formed on the body portion, and being in contact with the first face of the connecting component, and a second planar portion formed on the body portion opposite the first planar portion, and being in contact with the inner wall of the housing, and wherein the protrusion is formed to protrude from a first face of the body portion, which is extended from the first planar portion to the second planar portion.

8. The electronic device of claim 7, wherein the second face is parallel to the first direction and the second direction.

9. The electronic device of claim 7, wherein the waterproof device is not bonded to the connecting component.

10. The electronic device of claim 7, wherein the housing comprises a contact portion disposed adjacent to the opening and in contact with the body portion of the waterproof device.

11. The electronic device of claim 10, wherein the waterproof device further comprises a sealing portion configured to seal a gap between the inner wall of the housing and the body portion when the sealing portion is in contact with the contact portion.

12. The electronic device of claim 11, wherein the sealing portion is formed to be rounded, tapered, or inclined.

13. The electronic device of claim 9, wherein the body portion and the protrusion are made of resin, silicon, and/or urethane.

14. The electronic device of claim 9, wherein the body portion is formed in a closed curve shape.

15. The electronic device of claim 9, wherein the first planar portion corresponding to the first face of the connecting component.

16. The electronic device of claim 15, wherein the connecting component is a Universal Serial Bus (USB) connector.

17. The electronic device of claim 16, wherein the first face of the connecting component includes a peripheral portion, and the first planar portion of the waterproof device is seated on the peripheral portion.

18. A method of assembling a waterproof device in an electronic device, the method comprising:

providing a waterproof device including a body portion and a protrusion formed to protrude from the body portion;

causing the body portion to enclose a first face of a connecting component of the electronic device such that the protrusion faces a second face of the connecting component and is in contact with the second face of the connecting component; and bringing the body portion into contact with an inner wall of a housing of the electronic device by aligning a part of the connecting component to an opening of the electronic device, wherein the waterproof device comprises a first planar portion formed on the body portion, and being in contact with the first face of the connecting component, and a second planar portion formed on the body portion opposite the first planar portion, and being in contact with the inner wall of the housing, and wherein the protrusion is formed to protrude from a first face of the body portion, which is extended from the first planar portion to the second planar portion.

19. The method of claim 18, wherein the housing comprises a contact portion disposed adjacent to the opening and configured to be in contact with the body portion.

* * * * *